(12) United States Patent
Finkelshtein et al.

(10) Patent No.: US 11,228,609 B1
(45) Date of Patent: Jan. 18, 2022

(54) METHODS FOR MANAGING HTTP REQUESTS USING EXTENDED SYN COOKIE AND DEVICES THEREOF

(71) Applicant: F5 Networks, Inc., Seattle, WA (US)

(72) Inventors: Peter Finkelshtein, Tel Aviv (IL); Vadim Krishtal, Tel Aviv (IL)

(73) Assignees: F5 NETWORKS, INC., Seattle, WA (US); F5 NETWORKS (ISRAEL) LTD., Tel-Aviv (IL)

(*) Notice: Subject to any disclaimer, the term of this patent is extended or adjusted under 35 U.S.C. 154(b) by 72 days.

(21) Appl. No.: 16/859,607

(22) Filed: Apr. 27, 2020

Related U.S. Application Data

(60) Provisional application No. 62/838,595, filed on Apr. 25, 2019.

(51) Int. Cl.
| | |
|---|---|
| *H04L 9/32* | (2006.01) |
| *H04L 29/06* | (2006.01) |
| *H04L 29/08* | (2006.01) |
| *H04L 12/801* | (2013.01) |
| *H04L 12/911* | (2013.01) |

(52) U.S. Cl.
CPC ........ *H04L 63/1425* (2013.01); *H04L 9/3247* (2013.01); *H04L 47/10* (2013.01); *H04L 47/781* (2013.01); *H04L 63/1416* (2013.01); *H04L 67/02* (2013.01); *H04L 67/42* (2013.01)

(58) Field of Classification Search
CPC ... H04L 9/3247; H04L 63/14; H04L 63/1425; H04L 67/02
See application file for complete search history.

(56) References Cited

U.S. PATENT DOCUMENTS

| | | |
|---|---|---|
| 9,106,479 B1 | 8/2015 | Mukerji et al. |
| 9,338,192 B1* | 5/2016 | He ...................... H04L 67/2814 |
| 2007/0033392 A1* | 2/2007 | Ganesan ............... H04L 9/3226 |
| | | 713/155 |

(Continued)

OTHER PUBLICATIONS

Big-IP® Application Security Manager™: Attack and Bot Signatures, Version 13.0, F5 Networks, Inc., 2017.

(Continued)

*Primary Examiner* — Jeong S Park
(74) *Attorney, Agent, or Firm* — Troutman Pepper Hamilton Sanders LLP (Rochester)

(57) ABSTRACT

Methods, non-transitory computer readable media, network traffic manager apparatuses, and systems that assist with managing hypertext transfer protocol (HTTP) requests using extended SYN cookie includes establishing a network connection with a client without allocating a plurality of computing resources to the established network connection, in response to aa request to establish a connection from a client. Presence of a digital signature in a first data packet comprising a request for a webpage is determined. The digital signature is compared to a plurality of stored signatures to determine when the client is a nefarious computing device when the determination indicates that the received request includes the signature. The established network connection is terminated with the client without allocating the plurality of computing resources when the comparison indicates the client is the nefarious computing device.

20 Claims, 9 Drawing Sheets

(56) References Cited

U.S. PATENT DOCUMENTS

| | | | | |
|---|---|---|---|---|
| 2007/0234410 | A1* | 10/2007 | Geller | G06Q 20/3821 |
| | | | | 726/8 |
| 2008/0307093 | A1* | 12/2008 | Song | H04L 67/14 |
| | | | | 709/226 |
| 2014/0304810 | A1* | 10/2014 | Khanal | H04L 63/0428 |
| | | | | 726/22 |
| 2016/0285861 | A1* | 9/2016 | Chester | H04L 63/0823 |

OTHER PUBLICATIONS

"F5 Big-IP 5000s-5050s-5250v-5200v Hardware Datasheet," https://worldtechit.com/f5-products/f5-big-ip-5000s-5050s-5250v-5200v-hardware-datasheet/, Sep. 1, 2017.

* cited by examiner http.request.method eq GET and http.user_agent contains Chrome
and http.uri_parameters eq 6 and http.accept_header_exists eq false and http.headers_count eq 7

METHODS FOR MANAGING HTTP REQUESTS USING EXTENDED SYN COOKIE AND DEVICES THEREOF

This application claims the benefit of U.S. Provisional Patent Application Ser. No. 62/838,595, filed Apr. 25, 2019, which is hereby incorporated by reference in its entirety.

FIELD

This technology generally relates to methods and devices for network traffic management and, more particularly, to methods for managing hypertext transfer protocol (HTTP) requests using extended SYN cookie and devices thereof.

BACKGROUND

With the transmission control protocol (TCP), a handshake is used to establish a connection between a client and a server. The handshake involves the server receiving an initial packet called a synchronization (SYN) packet from the client and responding by sending a synchronization acknowledgement (SYN-ACK) packet. The client then responds by sending the server with an acknowledgement (ACK) packet. Once the handshake is successfully completed, then the server, in response to receiving the ACK packet, allocates connection resources to the connection.

Unfortunately, there is problem associated with allocating connection resources at this stage. In particular, even though the handshake is successfully completed, the server has unaware whether or not the client device with which the connection is established is a legitimate device or a nefarious device. As a result, connection resources may be allocated to a nefarious device and thus unavailable for allocation for other connection requests from other legitimate client devices. Accordingly, this misallocation of available resources may negatively impact the user experience of legitimate client devices.

SUMMARY

A method for managing hypertext transfer protocol (HTTP) requests using extended SYN cookie includes establishing a network connection with a client without allocating a plurality of computing resources to the established network connection, in response to a request to establish a connection from a client. Presence of a digital signature in a first data packet comprising a request for a webpage is determined. The digital signature is compared to a plurality of stored signatures to determine when the client is a nefarious computing device when the determination indicates that the received request includes the signature. The established network connection is terminated with the client without allocating the plurality of computing resources when the comparison indicates the client is the nefarious computing device.

A non-transitory computer readable medium having stored thereon instructions for managing hypertext transfer protocol (HTTP) requests using extended SYN cookie comprising machine executable code which when executed by at least one processor, causes the processor to establish a network connection with a client without allocating a plurality of computing resources to the established network connection, in response to a request to establish a connection from a client. Presence of a digital signature in a first data packet comprising a request for a webpage is determined. The digital signature is compared to a plurality of stored signatures to determine when the client is a nefarious computing device when the determination indicates that the received request includes the signature. The established network connection is terminated with the client without allocating the plurality of computing resources when the comparison indicates the client is the nefarious computing device.

A network traffic management apparatus including at least one of configurable hardware logic configured to be capable of implementing or a processor coupled to a memory and configured to establish a network connection with a client without allocating a plurality of computing resources to the established network connection, in response to a request to establish a connection from a client. Presence of a digital signature in a first data packet comprising a request for a webpage is determined. The digital signature is compared to a plurality of stored signatures to determine when the client is a nefarious computing device when the determination indicates that the received request includes the signature. The established network connection is terminated with the client without allocating the plurality of computing resources when the comparison indicates the client is the nefarious computing device.

A network traffic management system, comprising one or more traffic management apparatuses, client devices, or server devices, the network traffic management system comprising memory comprising programmed instructions stored thereon and one or more processors configured to be capable of executing the stored programmed instructions to establish a network connection with a client without allocating a plurality of computing resources to the established network connection, in response to a request to establish a connection from a client. Presence of a digital signature in a first data packet comprising a request for a webpage is determined. The digital signature is compared to a plurality of stored signatures to determine when the client is a nefarious computing device when the determination indicates that the received request includes the signature. The established network connection is terminated with the client without allocating the plurality of computing resources when the comparison indicates the client is the nefarious computing device.

This technology provides a number of advantages including providing methods, non-transitory computer readable media, apparatuses, and systems that assist with managing hypertext transfer protocol (HTTP) requests using extended SYN cookie. The disclosed technology waits until the first data packet is received to determine whether to allocate resources to the connection thereby avoiding allocating resources to a connection associated with a nefarious device and preventing a network attack. Additionally, by using the below illustrated techniques, the disclosed technology is able to only allocate connection resources to the connection only after verifying the signature from the client device. By doing so, the disclosed technology is able to avoid allocating connection resources for a nefarious device.

BRIEF DESCRIPTION OF THE DRAWINGS

FIGS. 7-8 are exemplary image illustrating the signatures in a request from a client device.

DETAILED DESCRIPTION

Figure 1:
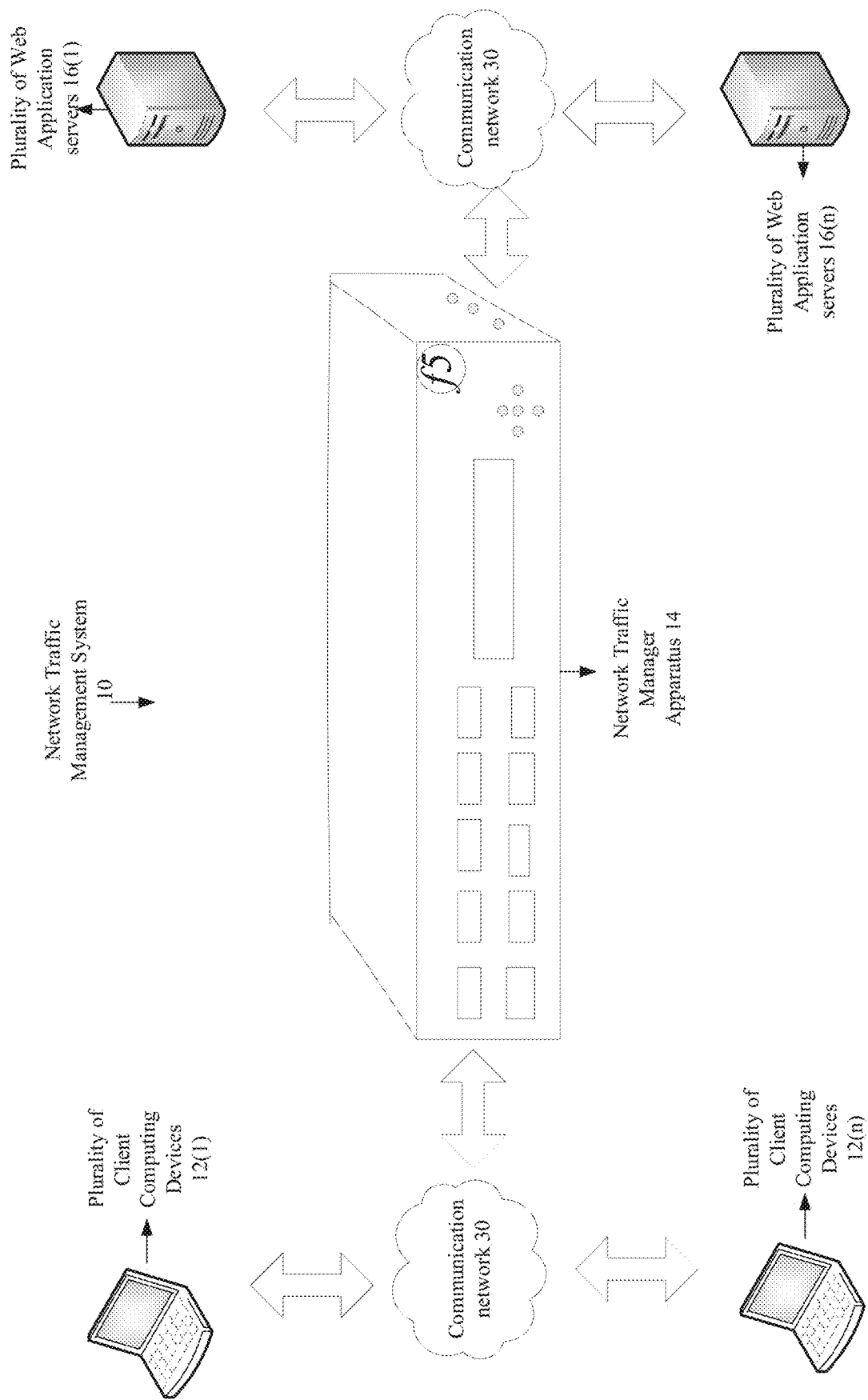
FIG. 1 is an example of a block diagram of a network traffic management system including a network traffic management apparatus for managing hypertext transfer protocol (HTTP) requests using extended SYN cookie.
Figure 2:
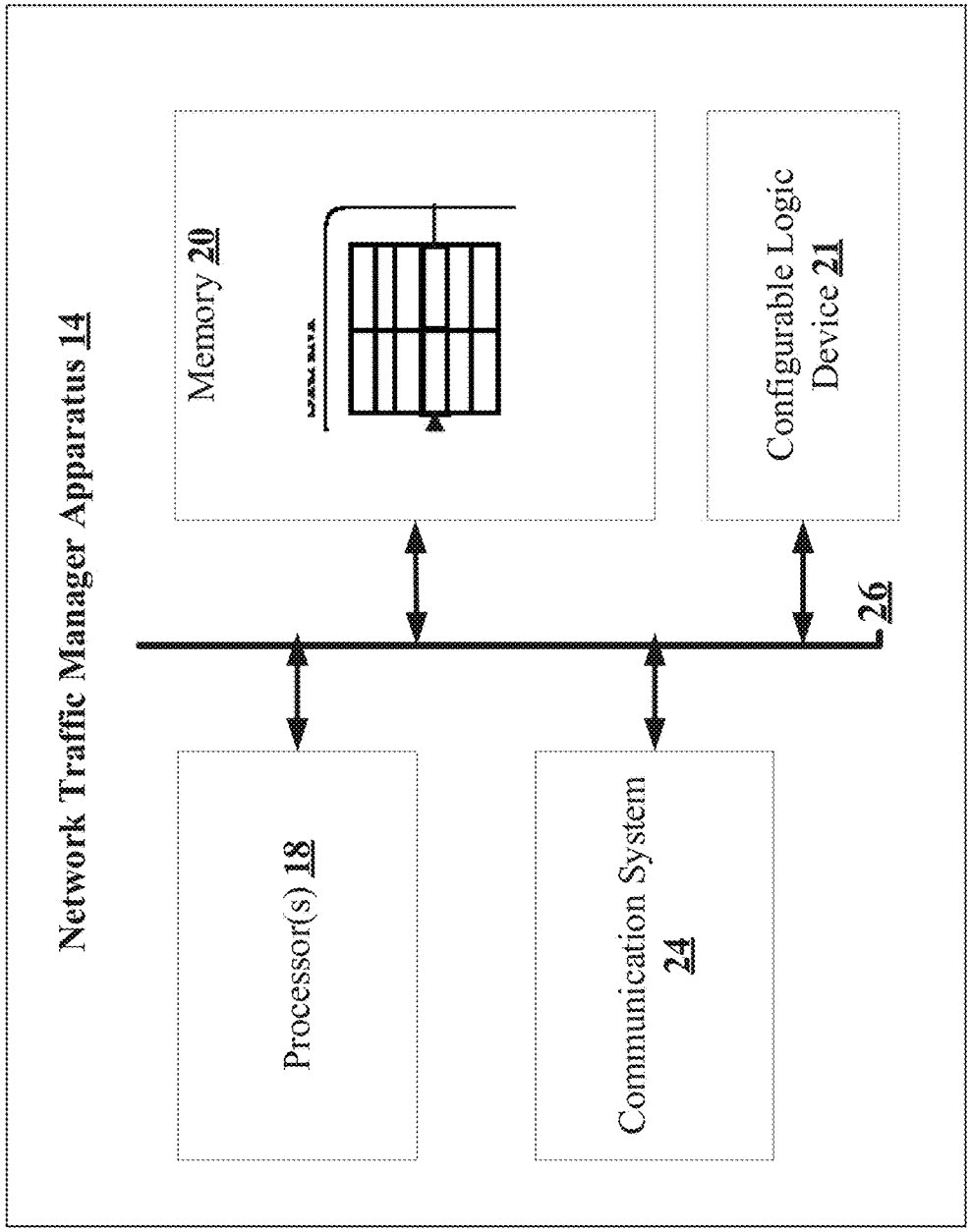
FIG. 2 is an example of a block diagram of a network traffic management apparatus.

An example of a network environment 10 which incorporates a network traffic management system for managing hypertext transfer protocol (HTTP) requests using extended SYN cookie with the network traffic manager apparatus 14 is illustrated in FIGS. 1 and 2. The exemplary environment 10 includes a plurality of client computing devices 12(1)-12(n), a network traffic manager apparatus 14, and a plurality of web application servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including managing hypertext transfer protocol (HTTP) requests using extended SYN cookie.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of web application servers 16(1)-16(n) through the communication network 30, although the web application servers 16(1)-16(n) and the network traffic manager apparatus 14 may be coupled together via other topologies.

The network traffic manager apparatus 14 assists with managing hypertext transfer protocol (HTTP) requests using extended SYN cookie as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
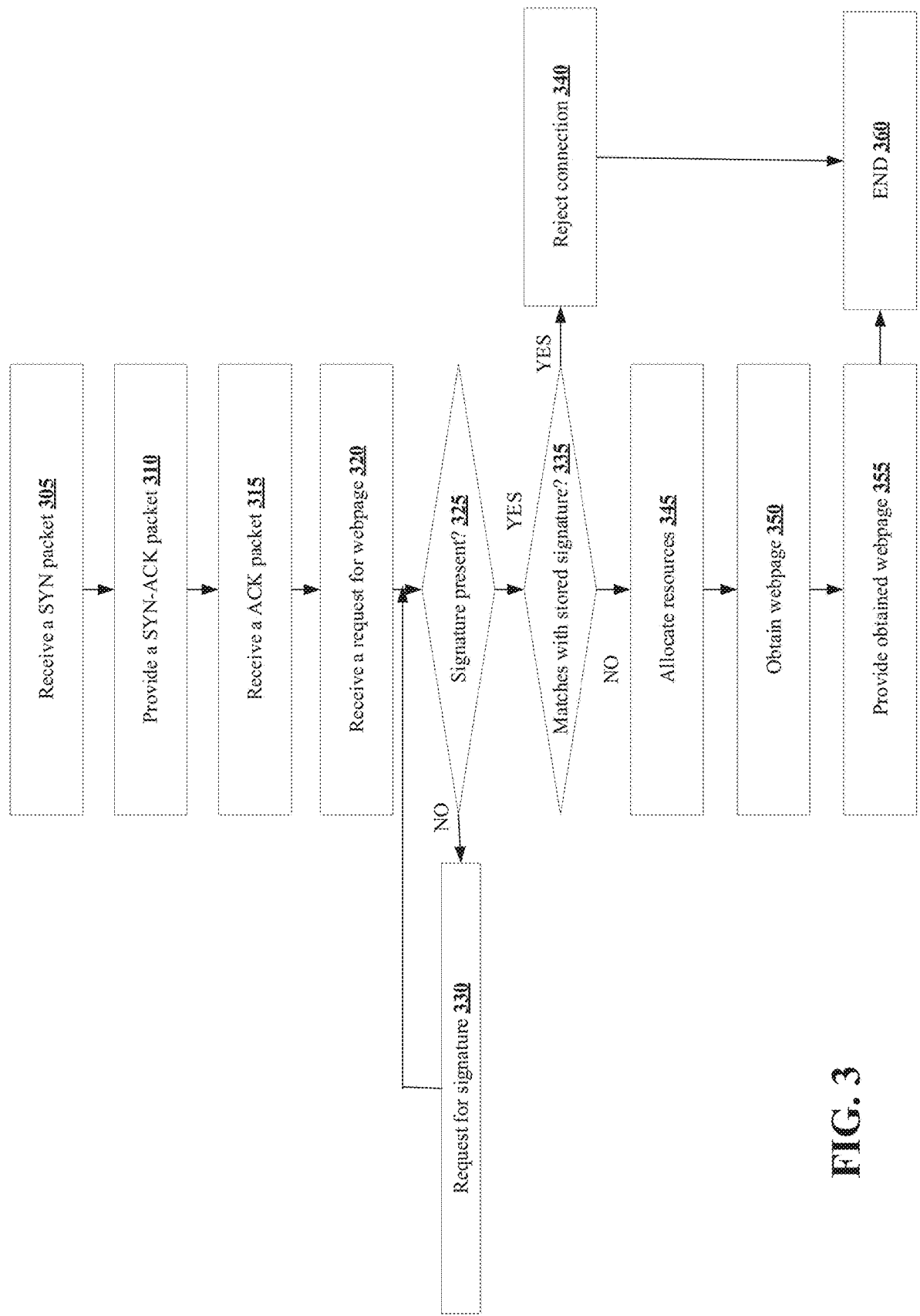
FIG. 3 is an exemplary flowchart of a method for managing hypertext transfer protocol (HTTP) requests using extended SYN cookie.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21. Additionally, as illustrated in FIG. 2, the memory 20 may include a table that is used to store signatures that is sent by plurality of client computing devices 12(1)-12(n). In this example, the signatures stored in the table can be used to determine when to drop the packet and the connection from the plurality of client computing devices 12(1)-12(n), although the signatures can be used for other purposes.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-9. The application(s) can be implemented as module or components of another application. Additionally, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits ("ASICs") and/or programmable logic units ("PLUs").

The communication system 24 in the network traffic manager apparatus 14 is used to operatively couple and communicate between the network traffic manager apparatus 14, the plurality of client computing devices 12(1)-12(n), and the plurality of web application servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the web application servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

Each of the plurality of web application servers 16(1)-16(n) of the network traffic management system include a central processing unit (CPU) or processor, a memory, and a communication system, which are coupled together by a bus or other link, although other numbers and/or types of network devices could be used. Generally, the plurality of web application servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of applications requested by the plurality of client computing devices 12(1)-12(n), or the network traffic manager apparatus 14. The plurality of web application servers 16(1)-16(n) may provide data or receive data in response to requests directed toward the respective applications on the plurality web application servers 16(1)-16(n) from the plurality of client computing devices 12(1)-12(n) or the network traffic manager apparatus 14. It is to be understood that the plurality of web application servers 16(1)-16(n) may be hardware or software or may represent a system with multiple external resource servers, which may include internal or external networks. In this example the plurality of web application servers 16(1)-16(n) may be any version of Microsoft IIS servers or Apache® servers, although other types of servers may be used.

Although the plurality of web application servers 16(1)-16(n) are illustrated as single servers, each of the plurality of web application servers 16(1)-16(n) may be distributed across one or more distinct network computing devices. Moreover, the plurality of web application servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of web application servers 16(1)-16(n) operate to manage and/or otherwise coordinate operations of the other network computing devices. The plurality of web application servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of web application servers 16(1)-16(n) depicted in FIG. 1 can operate within network traffic manager apparatus 14 rather than as a stand-alone server communicating with network traffic manager apparatus 14 via the communication network(s) 30. In this example the plurality of web application servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, plurality of web application servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of web application servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the plurality of web application servers 16(1)-16(n), for example, may be configured to operate as virtual instances on the same physical machine. In other words, one or more of network traffic manager apparatus 14, the plurality of client computing devices 12(1)-12(n), or the plurality of web application servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of web application servers 16(1)-16(n) than depicted in FIG. 1. The plurality of client computing devices 12(1)-12(n), the plurality of web application servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for managing hypertext transfer protocol (HTTP) requests using extended SYN cookie will now be described with reference to FIGS. 1-9. First in step 305 illustrated in FIG. 3 and FIG. 9, the network traffic manager apparatus 14 receives a transmission control protocol (TCP) connection request from one of the plurality of client computing devices 12(1)-12(n), although the network traffic manager apparatus 14 can receive other types of protocol such as transport layer security (TLS).

Figure 4:
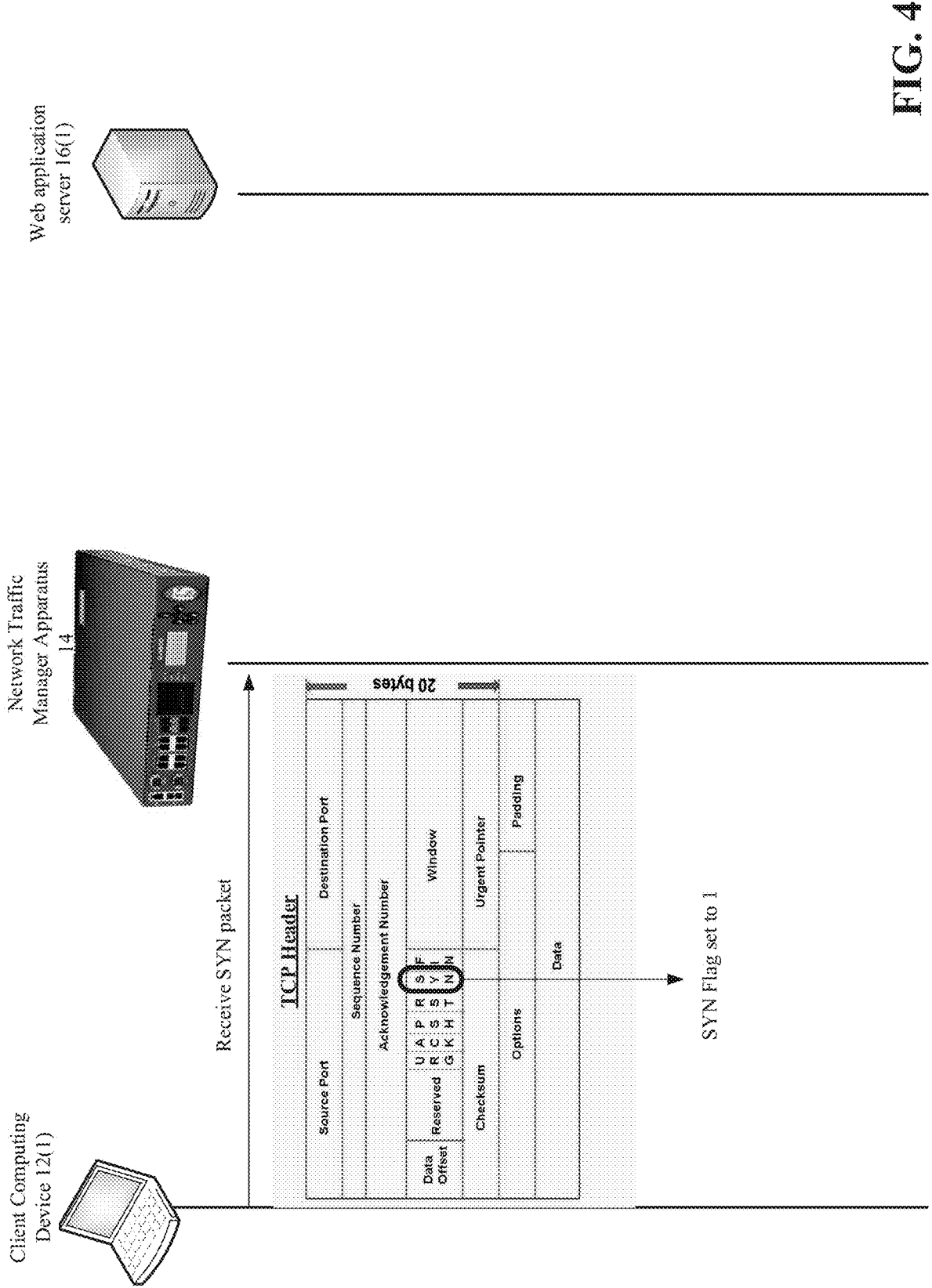
FIG. 4 is a sequence flow diagram illustrating a network traffic management apparatus receiving a connection request.

By way of example, FIG. 4 illustrates a TCP header format that is used by one of the plurality of client computing devices 12(1)-12(n) to send the connection request received by the network traffic manager apparatus 14. One of the flags present in the TCP header packet that is used for requesting a connection includes a SYN flag that is used to indicate that the TCP header packet is a SYN packet. The SYN flag present in the TCP header can be set to 1 to indicate that the packet received is the initial sequence number and can be set to 0 to indicate that the packet is an accumulated sequence number. Accordingly, in this example, the TCP connection request received by the network traffic manager apparatus 14 includes the SYN flag set to 1 indicating that the connection request is a SYN packet.

Figure 9:
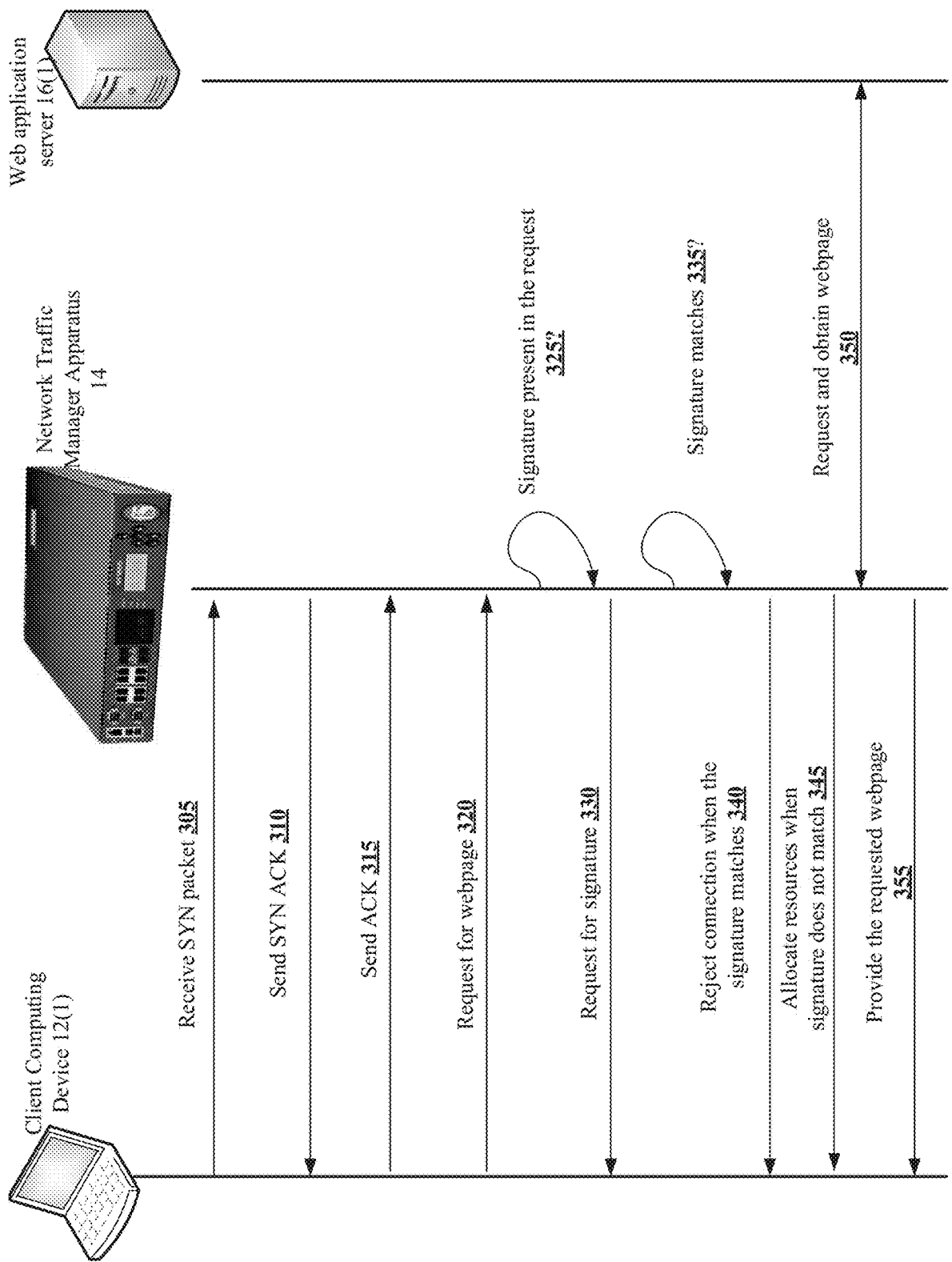
FIG. 9 is an exemplary sequence flow diagram illustrating the method for managing hypertext transfer protocol (HTTP) requests using extended SYN cookie.

In step 310 illustrated in FIG. 3 and FIG. 9, in response to the SYN packet the network traffic manager apparatus 14 sends a SYN ACK packet back to the requesting one of the plurality of client computing devices 12(1)-12(n) to authorize the requesting one of the plurality of client computing devices 12(1)-12(n) to establish the connection.

Figure 5:
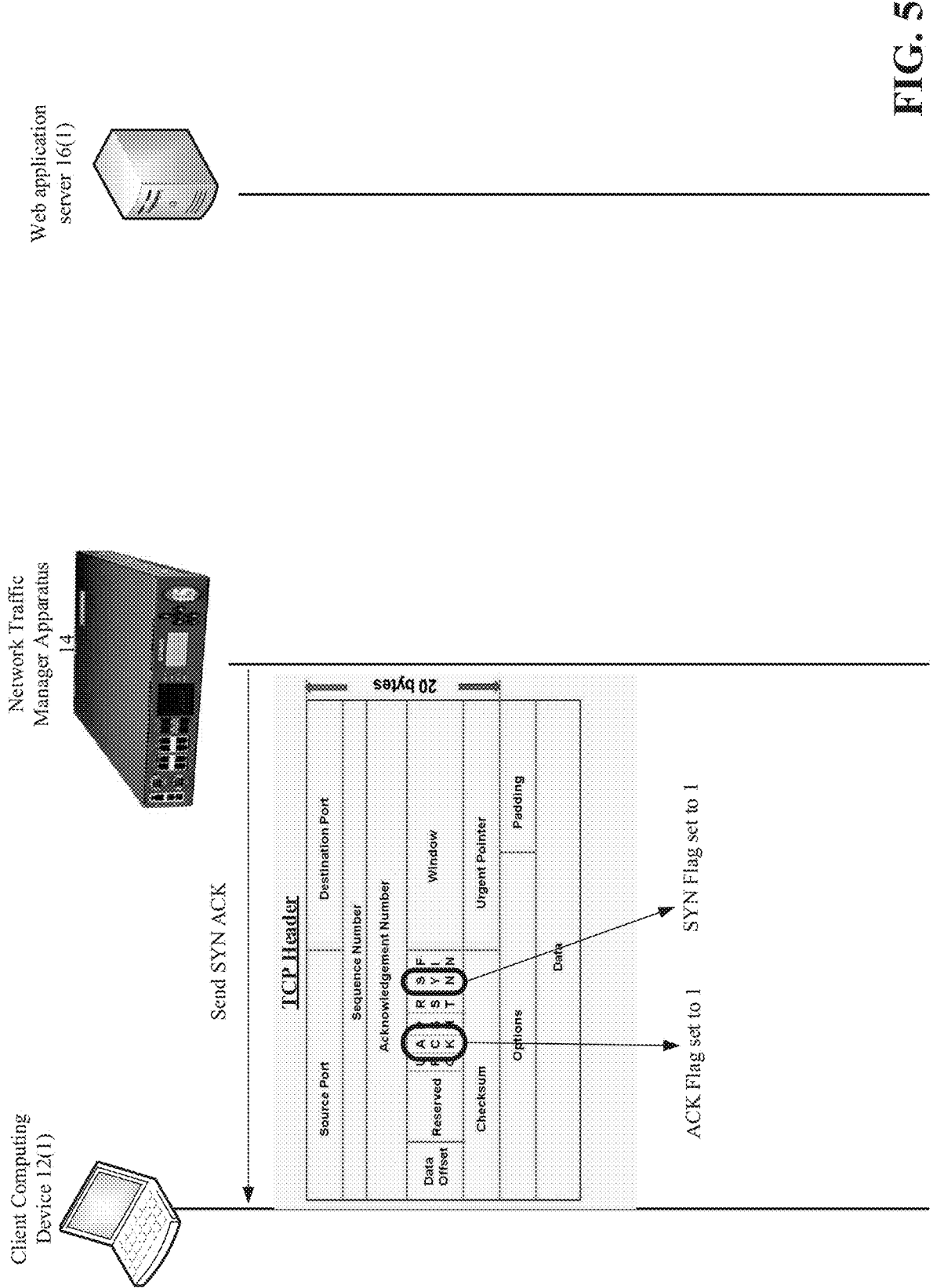
FIG. 5 is a sequence flow diagram illustrating the network traffic management apparatus sending a response to the connection request.

By way of example, FIG. 5 illustrates the TCP header format illustrating the SYN ACK packet that is sent to the requesting one of the plurality of client computing devices 12(1)-12(n), by the network traffic manager apparatus 14. In the SYN ACK packet, the ACK flag is set to 1 indicating the connection request was successfully received by the network traffic manager apparatus 14. Additionally, in this example, the network traffic manager apparatus 14 only authorizes the requesting one of the plurality of client computing devices 12(1)-12(n) to establish the connection, but does not allocate any resources such as CPU resource or memory resource, to the connection.

In step 315 illustrated in FIG. 3 and FIG. 9, the network traffic manager apparatus 14 receives an ACK packet from the requesting one of the plurality of client computing devices 12(1)-12(n) indicating that a TCP connection is successfully established with the network traffic manager apparatus 14.

Figure 6:
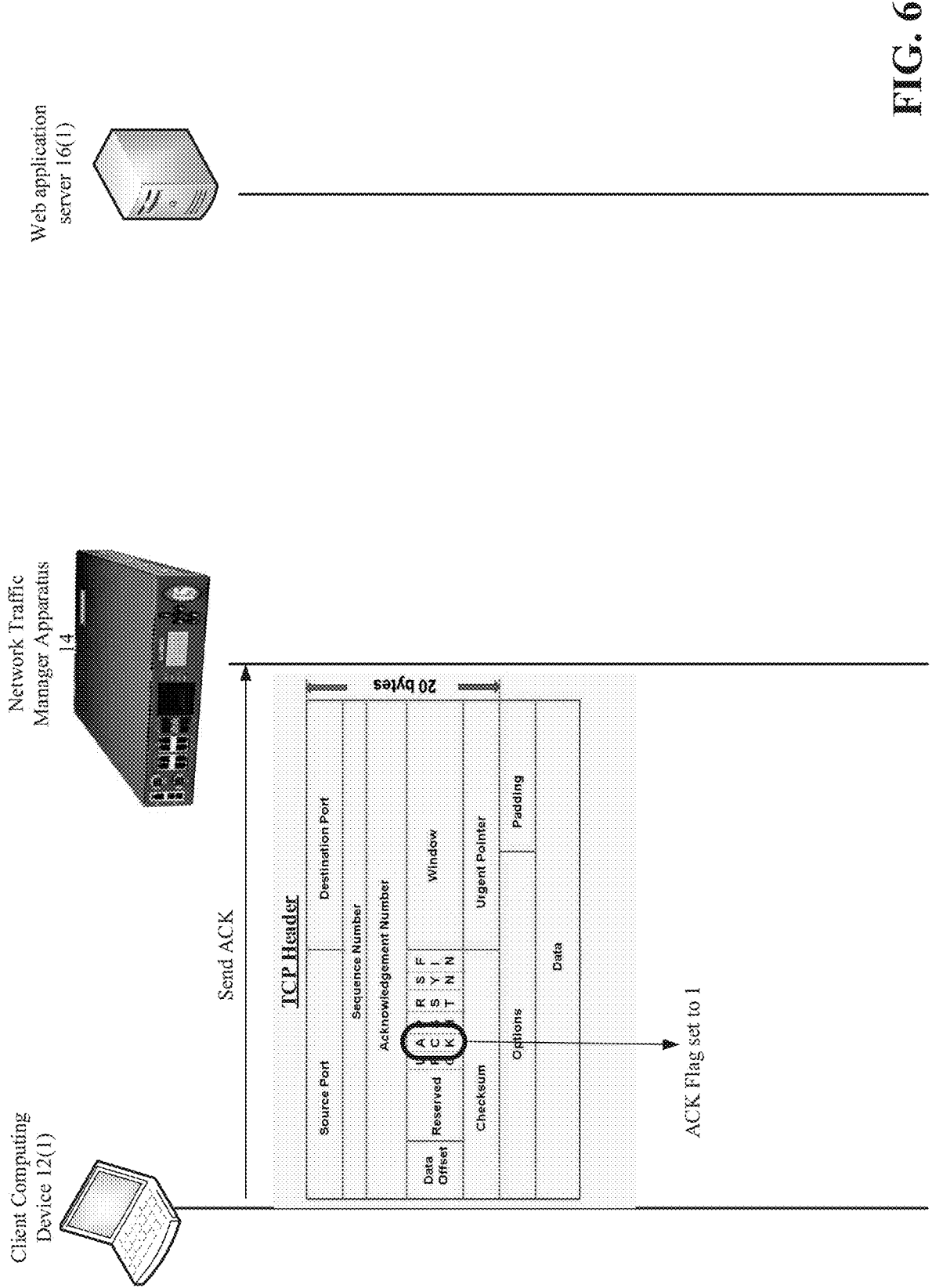
FIG. 6 is a sequence flow diagram illustrating the network traffic management apparatus receiving a message indicating successful connection.

By way of example, FIG. 6 illustrates the TCP header format illustrating the ACK packet that is received by the network traffic manager apparatus 14. In this example, the ACK packet received by the network traffic manager apparatus 14 includes the ACK flag within the TCP header to be set to indicate the completion of the three way handshake required to establish a TCP connection.

In step 320 illustrated in FIG. 3 and FIG. 9, the network traffic manager apparatus 14 receives a hypertext transfer protocol (HTTP) request for a webpage from the requesting one of the plurality of client computing devices 12(1)-12(n) that has established the TCP connection, although the network traffic manager apparatus 14 can receive other types or amounts of requests. In this example, the HTTP request for the webpage is the first data packet that is received by the network traffic manager apparatus 14 and the network traffic manager apparatus 14 can further process the received request without terminating the established TCP connection and allocating the computing resources. In this example, the received HTTP request may or may not include a signature and in this example, signature relates to digitally signing the HTTP request using either symmetric or asymmetric keys. The signature helps to both verify the identity of the sender and verify that the message was not tampered during the transmission. In this example, the signature includes a keyID, data associated with an algorithm, optional header related data, and the signature itself, although the signature can include other types or amounts of information. The keyID in this example is an opaque string that the network traffic manager apparatus 14 can use to look up to validate the signature, although the keyID can include other types or amounts of information. Further, the data associated with the algorithm includes data that is used to specify the digital signatures algorithm that is used when the signature was generated, although the data associated with the algorithm includes other types or amounts of information. Furthermore, the signature in this example, is a 64 encoded digital signature, although the digital signature can be in other configurations.

Figure 8:
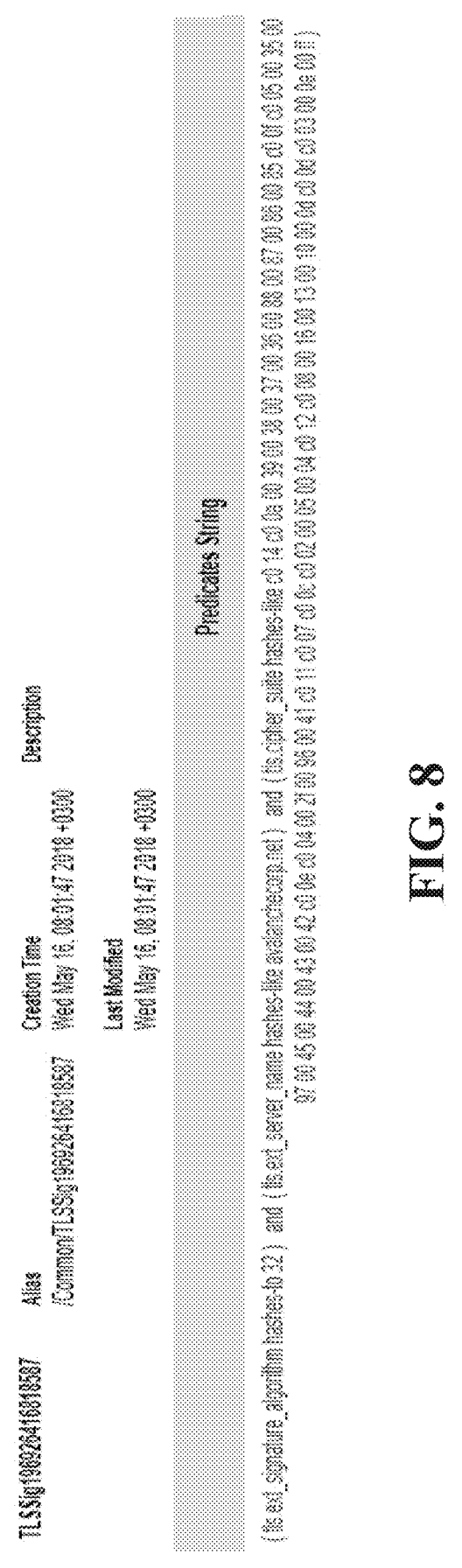

In step 325 illustrated in FIG. 3 and FIG. 9, the network traffic manager apparatus 14 determines if there is a signature in this received request for the webpage. By way of example, FIGS. 7-8 include examples of a signature in the received HTTP request. In particular, FIG. 7 illustrates an example of an HTTP signature that can be included in the received request for the webpage. Alternatively, FIG. 8 illustrates a TLS signature that can be sent along with the received request. In this example, the signature can be included in the header of the HTTP request, although the network traffic manager apparatus 14 can obtain the signature during an HTTP authentication scheme.

If in step 325, the network traffic manager apparatus 14 determines that the received request does not include a signature, then the No branch is taken to step 330. In step 330 illustrated in FIG. 3 and FIG. 9, the network traffic manager apparatus 14 requests the requesting one of the plurality of client computing devices 12(1)-12(n) to include a signature and the exemplary flow proceeds back to step 325. By way of example, the network traffic manager apparatus 14 can request the client to include a signature using a 401 response code, although other techniques can be used to request the requesting one of the plurality of client computing devices 12(1)-12(n) to include the signature. In order to include the signature, the requesting one of the plurality of client computing devices 12(1)-12(n) first is required to use the contents of the HTTP request, the header values, and the signature string to create a signature string. Next, the requesting one of the plurality of client computing devices 12(1)-12(n) uses the algorithm and the key associated with the keyID to generate a digital signature on the signature string. Furthermore, the requesting one of the plurality of client computing devices 12(1)-12(n) generates the signature by base 64 encoding the output of the digital signature algorithm, although the requesting one of the plurality of client computing devices 12(1)-12(n) can use other techniques to generate a digital signature.

However, if back in step 325 the network traffic manager apparatus 14 determines that there is a signature in the received request, then the Yes branch is taken to step 335. In step 335 illustrated in FIG. 3 and FIG. 9, the network traffic manager apparatus 14 compares the signature in the received request with a plurality of stored signatures within a table in memory 20 to determine if the received signature exactly matches with at least one of the stored signatures, although the received signature can be compared against signatures from stored at other locations and other manners for determining if the received signature is associated with a nefarious computing device may be used. In this example, the network traffic manager apparatus 14 can use the keyID parameter present in the received signature to determine if the signature in the received request exactly matches with the one of the plurality of stored signatures, although other techniques can be used to make the determination. By way of example, the network traffic manager apparatus 14 identifies the signature associated with the received keyID in the table within the memory 20 and then compares the stored signature with the received signature, although other techniques can be used to make the comparison.

If in step 335, the network traffic manager apparatus 14 determines that the received signature exactly matches with at least one of the stored signature, then the Yes branch is taken to step 340. In step 340 illustrated in FIG. 3 and FIG. 9, the network traffic manager apparatus 14 rejects the received request for the webpage and disconnects the established TCP connection with the requesting one of the plurality of client computing devices 12(1)-12(n) and the exemplary flow ends at step 360. Accordingly, in this example by making this determination the network traffic manager apparatus 14 is determining that the requesting one of the plurality of client computing devices 12(1)-12(n) is a nefarious computing device that is intending to attack one of the plurality of web application servers 16(1)-16(n) or the network system. Accordingly, by rejecting or disconnecting the TCP connection before allocating any computing resources, the network traffic manager apparatus 14 is able to not only save computing resources for legitimate network connections, but also is able to prevent a network attack.

However, if back in step 335 the network traffic manager apparatus 14 determines that the received signature does not match with any of the stored signatures, then the No branch is taken to step 345. In step 345 illustrated in FIG. 3 and FIG. 9, the network traffic manager apparatus 14 allocates one or more computing resources to the TCP connection associated with the requesting one of the plurality of client computing devices 12(1)-12(n). Accordingly, in this example, the network traffic manager apparatus 14 has determined that the requesting one of the plurality of client computing devices 12(1)-12(n) is a legitimate computing device or a legitimate connection when the received signature does not match when any of the stored signatures. As a result, the network traffic manager apparatus 14 ensures that the allocated resources which may for example includes memory resources and/or processing resources are allocated to a legitimate device. Additionally, in this example the network traffic manager apparatus 14 manages this by waiting until the first data packet is received to determine whether to allocate resources to the connection thereby avoiding allocating resources to a connection associated with a nefarious device and preventing a network attack.

In step 350 illustrated in FIG. 3 and FIG. 9, the network traffic manager apparatus 14 obtains the requested webpage from one of the plurality of web application servers 16(1)-16(n), although the network traffic manager apparatus 14 can obtain the requested webpage from other locations.

In step 355 illustrated in FIG. 3 and FIG. 9, the network traffic manager apparatus 14 provides the obtained webpage back to the requesting one of the plurality of client computing devices 12(1)-12(n) and the exemplary process ends at step 360.

This technology provides a number of advantages including providing methods, non-transitory computer readable media, apparatuses, and systems that assist with managing hypertext transfer protocol (HTTP) requests using extended SYN cookie. The disclosed technology waits until the first data packet is received to determine whether to allocate resources to the connection thereby avoiding allocating resources to a connection associated with a nefarious device and preventing a network attack. Additionally, by using the above illustrated techniques, the disclosed technology is able to only allocate connection resources to the connection only after verifying the signature from the client device. By doing so, the disclosed technology is able to avoid allocating connection resources for a nefarious device.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for managing hypertext transfer protocol (HTTP) requests using extended SYN cookie, the method implemented by a network traffic management system comprising one or more network traffic apparatuses, client devices, or server devices, the method comprising:
   establishing a network connection with a client without allocating a plurality of computing resources to the established network connection, in response to a request to establish a connection from a client;
   determining when a first data packet comprising a request for a webpage from the client via the established network connection, comprises a digital signature;
   comparing the digital signature to a plurality of stored signatures to determine when the client is a nefarious computing device when the determination indicates that the received request includes the signature; and
   terminating the established network connection with the client without allocating the plurality of computing resources when the comparison indicates the client is the nefarious computing device.

2. The method as set forth in claim 1 further comprising allocating the plurality of computing resources to the established network connection when the comparison fails to indicate that the client is the nefarious computing device, prior to obtaining the requested webpage.

3. The method as set forth in claim 1 wherein the determination of when the first data packet comprises the digital signature is performed without terminating the established network connection and without allocating the plurality of computing resources to the established network connection.

4. The method as set forth in claim 1 further comprising providing the obtained webpage to the client after allocating the plurality of computing resources to the established network connection.

5. The method as set forth in claim 1 further comprising, requesting the client to include the digital signature when the first data packet comprising the request fails to includes the digital signature without allocating the plurality of computing resources to the established network connection and without terminating the established network connection.

6. A non-transitory computer readable medium having stored thereon instructions for managing hypertext transfer protocol (HTTP) requests using extended SYN cookie comprising executable code which when executed by one or more processors, causes the processors to:
   establish a network connection with a client without allocating a plurality of computing resources to the established network connection, in response to a request to establish a connection from a client;
   determine when a first data packet comprising a request for a webpage from the client via the established network connection, comprises a digital signature;
   compare the digital signature to a plurality of stored signatures to determine when the client is a nefarious computing device when the determination indicates that the received request includes the signature; and
   terminate the established network connection with the client without allocating the plurality of computing resources when the comparison indicates the client is the nefarious computing device.

7. The medium as set forth in claim 6 further comprising one or more additional instructions which when executed by one or more processors, causes the processors to allocate the plurality of computing resources to the established network connection when the comparison fails to indicate that the client is the nefarious computing device, prior to obtaining the requested webpage.

8. The medium as set forth in claim 6 wherein the determination of when the first data packet comprises the digital signature is performed without terminating the established network connection and without allocating the plurality of computing resources to the established network connection.

9. The medium as set forth in claim 6 further comprising one or more additional instructions which when executed by one or more processors, causes the processors to provide the obtained webpage to the client after allocating the plurality of computing resources to the established network connection.

10. The medium as set forth in claim 6 further comprising one or more additional instructions which when executed by one or more processors, causes the processors to request the client to include the digital signature when the first data packet comprising the request fails to includes the digital signature without allocating the plurality of computing resources to the established network connection and without terminating the established network connection.

11. A network traffic manager apparatus, comprising memory comprising programmed instructions stored in the memory and one or more processors configured to be capable of executing the programmed instructions stored in the memory to:
   establish a network connection with a client without allocating a plurality of computing resources to the established network connection, in response to a request to establish a connection from a client;
   determine when a first data packet comprising a request for a webpage from the client via the established network connection, comprises a digital signature;
   compare the digital signature to a plurality of stored signatures to determine when the client is a nefarious computing device when the determination indicates that the received request includes the signature; and
   terminate the established network connection with the client without allocating the plurality of computing resources when the comparison indicates the client is the nefarious computing device.

12. The device as set forth in claim 11 wherein the one or more processors are further configured to be capable of executing the programmed instructions stored in the memory to allocate the plurality of computing resources to the established network connection when the comparison fails to indicate that the client is the nefarious computing device, prior to obtaining the requested webpage.

13. The device as set forth in claim 11 wherein the determination of when the first data packet comprises the digital signature is performed without terminating the established network connection and without allocating the plurality of computing resources to the established network connection.

14. The device as set forth in claim 11 wherein the one or more processors are further configured to be capable of executing the programmed instructions stored in the memory to provide the obtained webpage to the client after allocating the plurality of computing resources to the established network connection.

15. The device as set forth in claim 11 wherein the one or more processors are further configured to be capable of executing the programmed instructions stored in the memory to request the client to include the digital signature when the first data packet comprising the request fails to includes the digital signature without allocating the plurality of computing resources to the established network connection and without terminating the established network connection.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
- establish a network connection with a client without allocating a plurality of computing resources to the established network connection, in response to a request to establish a connection from a client;
- determine when a first data packet comprising a request for a webpage from the client via the established network connection, comprises a digital signature;
- compare the digital signature to a plurality of stored signatures to determine when the client is a nefarious computing device when the determination indicates that the received request includes the signature; and
- terminate the established network connection with the client without allocating the plurality of computing resources when the comparison indicates the client is the nefarious computing device.

17. The network traffic management system of claim 16, wherein the one or more processors are further configured to be capable of executing the programmed instructions stored in the memory to allocate the plurality of computing resources to the established network connection when the comparison fails to indicate that the client is the nefarious computing device, prior to obtaining the requested webpage.

18. The network traffic management system of claim 16, wherein the determination of when the first data packet comprises the digital signature is performed without terminating the established network connection and without allocating the plurality of computing resources to the established network connection.

19. The network traffic management system of claim 16, wherein the one or more processors are further configured to be capable of executing the programmed instructions stored in the memory to provide the obtained webpage to the client after allocating the plurality of computing resources to the established network connection.

20. The network traffic management system of claim 16, wherein the one or more processors are further configured to be capable of executing the programmed instructions stored in the memory to request the client to include the digital signature when the first data packet comprising the request fails to includes the digital signature without allocating the plurality of computing resources to the established network connection and without terminating the established network connection.

* * * * *